United States Patent
Gorval et al.

(10) Patent No.: US 11,148,955 B2
(45) Date of Patent: Oct. 19, 2021

(54) SYNTHESIS DEVICE AND METHOD FOR PRODUCING A PRODUCT

(71) Applicants: thyssenkrupp Industrial Solutions AG, Essen (DE); thyssenkrupp AG, Essen (DE)

(72) Inventors: Evgeni Gorval, Dortmund (DE); Joachim Johanning, Oberhausen (DE); Reinhard Michel, Bochum (DE)

(73) Assignees: thyssenkrupp Industrial Solutions AG, Essen (DE); thyssenkrupp AG, Essen (DE)

( * ) Notice: Subject to any disclaimer, the term of this patent is extended or adjusted under 35 U.S.C. 154(b) by 443 days.

(21) Appl. No.: 16/324,780

(22) PCT Filed: Aug. 3, 2017

(86) PCT No.: PCT/EP2017/069679
§ 371 (c)(1),
(2) Date: Feb. 11, 2019

(87) PCT Pub. No.: WO2018/029082
PCT Pub. Date: Feb. 15, 2018

(65) Prior Publication Data
US 2019/0185334 A1 Jun. 20, 2019

(30) Foreign Application Priority Data
Aug. 9, 2016 (DE) .................. 10 2016 114 713.3

(51) Int. Cl.
*B01J 8/00* (2006.01)
*B01J 8/02* (2006.01)
(Continued)

(52) U.S. Cl.
CPC ............. *C01C 1/0417* (2013.01); *B01J 8/008* (2013.01); *B01J 8/0415* (2013.01); *B01J 8/0492* (2013.01);
(Continued)

(58) Field of Classification Search
CPC ....... B01J 8/00; B01J 8/008; B01J 8/02; B01J 8/04; B01J 8/0415; B01J 8/0492;
(Continued)

(56) References Cited

U.S. PATENT DOCUMENTS

4,230,669 A 10/1980 Eagle
5,250,270 A * 10/1993 Noe ..................... B01J 8/0214
422/607
(Continued)

*Primary Examiner* — Natasha E Young
(74) *Attorney, Agent, or Firm* — thyssenkrupp North America, LLC (57) ABSTRACT

A synthesis device may include a pressure vessel with an inlet and an outlet for fluid, a catalyst bed that is disposed within the pressure vessel, a plate heat exchanger that is disposed in a flow path of fluid between the inlet of the pressure vessel and the catalyst bed such that fluid flowing into the catalyst bed is heated by fluid flowing out of the catalyst bed. The plate heat exchanger may be disposed outside a reactor volume occupied by the catalyst bed in the pressure vessel. The catalyst bed may be one of a plurality of catalyst beds disposed axially over one another in the pressure vessel.

15 Claims, 5 Drawing Sheets

(51) Int. Cl.
*B01J 8/04* (2006.01)
*B01J 19/00* (2006.01)
*B01J 19/24* (2006.01)
*C01C 1/04* (2006.01)

(52) U.S. Cl.
CPC ...... *B01J 8/0496* (2013.01); *B01J 2208/0015* (2013.01); *B01J 2208/0053* (2013.01); *B01J 2208/00212* (2013.01); *B01J 2208/025* (2013.01); *Y02P 20/52* (2015.11)

(58) Field of Classification Search
CPC . B01J 8/0496; B01J 19/00; B01J 19/24; B01J 2208/00; B01J 2208/00008; B01J 2208/00017; B01J 2208/00106; B01J 2208/00168; B01J 2208/0015; B01J 2208/00212; B01J 2208/0053; B01J 2208/02; B01J 2208/023; B01J 2208/024; B01J 2208/025; B01J 2219/00; B01J 2219/24; C01C 1/00; C01C 1/02; C01C 1/04; C01C 1/0405; C01C 1/0417
See application file for complete search history.

(56) References Cited

U.S. PATENT DOCUMENTS 8,529,961 B2 * 9/2013 Campbell .............. A61K 38/22
 424/530
8,852,538 B2 * 10/2014 Olbert ...................... C07C 5/48
 422/631

* cited by examiner

SYNTHESIS DEVICE AND METHOD FOR PRODUCING A PRODUCT

CROSS REFERENCE TO RELATED APPLICATIONS

This application is a U.S. National Stage Entry of International Patent Application Serial Number PCT/EP2017/069679, now WO 2018/029082, filed Aug. 3, 2017, which claims priority to German Patent Application No. DE 10 2016 114 713.3, filed Aug. 9, 2016, the entire contents of both of which are incorporated herein by reference.

FIELD

The present disclosure generally relates to synthesis devices, including ammonia synthesis converters and synthesis devices for exothermic reactions with heterogeneous catalysis.

BACKGROUND

Ammonia synthesis converters typically comprise a plurality of catalyst beds and heat exchangers which are disposed within a pressure vessel.

WO 2014/040719 A1 describes a method and a device for producing dimethyl ether by catalytic dehydrogenation of methanol, with subsequent distillation of the dehydrogenated product, using a synthesis device having a pressure vessel which may comprise a plurality of catalyst beds with interposed heat exchangers. Heat exchangers said to be suitable here are all known types, and not only helical heat exchangers and tube bundle heat exchangers but also plate heat exchangers are stated, but their construction in detail is not further specified.

DE 10 2006 061 847 A1 discloses an ammonia synthesis converter having at least one catalyst bed, the flow through this bed being substantially radial and the bed surrounding a tube bundle heat exchanger concentrically. By means of the tube bundle heat exchanger, the heat of reaction of the fluid flowing out of the catalyst bed is transferred to fluid which is introduced into the catalyst bed. Because of the low heat flow density, this kind of heat exchanger takes up a relatively large volume in relation to the heat output transferred, which accordingly is not available for further catalyst material. The effect of this on the throughput of the synthesis converter is negative. Economical design of an ammonia converter necessitates optimum utilization of the reactor volume. This includes a rational division of volume between the catalyst beds, the heat exchangers, and the feed pathways. Owing to the generally relatively high operating pressures of the synthesis reactors, moreover, pressure vessels are expensive components. Minimizing the correspondingly expensive pressure vessel volumes is therefore a general aim.

Known from WIPO Patent Publication No. WO2013/017609 A1 is a reactor for carrying out an autothermal gas phase dehydrogenation, having a gas-tight housing containing an inner region with a plurality of catalytic zones and a heat exchanger, which can be a plate heat exchanger and which is located in the flow path between an inlet and a catalyst bed, in such a way that the gas stream for dehydrogenation is heated in the heat exchanger by the reaction gas mixture. The heat exchanger may be sited below the catalyst beds.

U.S. Pat. No. 4,230,669 A describes a radial ammonia converter wherein hollow cylindrical catalyst beds are located in a pressure vessel, the converter comprising a plurality of heat exchangers. Over a part of its axial length, one of the heat exchangers lies concentrically within one of the catalyst beds, and so the process gas, after flowing through the catalyst bed, flows radially inward into the heat exchanger. The heat exchangers of this known ammonia converter, however, are tube bundle heat exchangers.

Known generally from WIPO Patent Publication No. WO2010/103190 are plate heat exchangers which comprise a plurality of plates, where between pairs of adjacent plates a flow-traversible interspace is formed, and where flow-traversible interspaces of a first group are in fluid communication with a common first fluid channel, running perpendicularly to the plates, and are sealed off from the surroundings of the plate heat exchanger, and flow-traversible interspaces of a second group are in fluid communication with the surroundings and are sealed off from the interspaces of the first fluidgroup.

Thus a need exists for increasing the economy of synthesis devices.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a"

element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to synthesis devices, including synthesis devices for exothermic reactions with heterogeneous catalysis. The present disclosure generally relates to ammonia synthesis converters. In some examples, a synthesis device may include a pressure vessel that comprises an inlet and an outlet for a fluid, at least one catalyst bed that is disposed within the pressure vessel, and at least one heat exchanger disposed in a flow path of the fluid between the inlet of the pressure vessel and the catalyst bed such that the fluid flowing into the catalyst bed is heated by the fluid flowing out of the catalyst bed. The heat exchanger in the synthesis device may be disposed outside a reactor volume occupied by the catalyst bed in the pressure vessel. The present disclosure further relates to methods for producing products.

A first aspect of the present disclosure relates to a synthesis device, more particularly an ammonia synthesis converter. The heat exchanger may be configured as a plate heat exchanger and this exchanger in the synthesis device may be is disposed outside the reactor volume occupied by the catalyst bed in the pressure vessel. At least one catalyst bed may have a cylinder ring shape or hollow cylindrical configuration. The plate heat exchanger may be disposed on the inside of the hollow cylindrical catalyst bed so that the bed surrounds the plate heat exchanger concentrically.

The synthesis device comprises at least one heat exchanger which is disposed in the flow path of the fluid between the inlet of the pressure vessel and the catalyst bed and via which the fluid can be heated before it is introduced into the catalyst bed. The heat exchanger is configured as a plate heat exchanger. By comparison with tube bundle heat exchangers of the same size, plate heat exchangers have an increased heat flow density, allowing a heat exchanger with a lower volume to be used for the same heat output. The volume saving through the use of a plate heat exchanger can be utilized to enlarge the volume of the catalyst bed, thereby increasing the reaction throughput and hence the economy of the synthesis device. Alternatively, the volume of the pressure vessel can be reduced, allowing savings to be made in production costs, construction costs and/or assembly costs.

The pressure vessel preferably has a cylindrical shape with a vertically oriented longitudinal axis. The inlet of the pressure vessel is preferably disposed at the upper end of the pressure vessel, and the outlet at the lower end of the pressure vessel. The pressure vessel is preferably operated at a pressure in the range from 90 to 400 bar. The term "fluid" here preferably encompasses gases and liquids.

The synthesis device further comprises at least one catalyst bed, more preferably at least two or at least three catalyst beds. The synthesis device is preferably based on a radial flow through the catalyst beds, with the catalyst beds preferably having the shape of hollow cylinders. The fluids are supplied preferably via cylindrical circumferential surfaces of the catalyst beds. The fluids may flow through the catalyst beds both radially from outside to inside and radially from inside to outside. Within the synthesis device, flow through all of the catalyst beds may be radial from outside to inside, or flow through all of the catalyst beds may be radial from inside to outside. Similarly, within the synthesis device, flow through at least one catalyst bed may be radial from inside to outside, and flow through at least one other catalyst bed may be radial from outside to inside.

In accordance with the invention, the heat exchanger configured as a plate heat exchanger is not disposed within a catalyst bed, and so there is no risk of the heat exchanger being adversely affected by the bed of catalyst.

The synthesis device preferably comprises a plurality of heat exchangers. It is possible for two or more heat exchangers to be assigned to a common catalyst bed in order to preheat the fluid flowing into the catalyst bed. An alternative possibility is to provide a plurality of heat exchangers each of which is assigned to a catalyst bed, so that the fluid flowing into the catalyst bed in question is preheated via precisely one heat exchanger. The heat exchangers may all be configured as plate heat exchangers. In principle, within the present invention, it is also possible, further to the plate heat exchanger or exchangers used, for there to be one or more tube bundle heat exchangers disposed in the synthesis device as well.

In the case of a synthesis device which comprises a plurality of catalyst beds, preferably disposed over one another in the axial direction of the synthesis device, a heat exchanger may be provided in the region between two catalyst beds, so that the fluid flowing out of the first catalyst bed can be passed through the heat exchanger to the second catalyst bed. In the case of this arrangement, a tube bundle heat exchanger disposed centrally within a hollow cylindrical catalyst bed can be replaced, and the construction space required for the heat exchanger can be minimized by comparison with synthesis devices featuring tube bundle heat exchangers.

In an alternatively preferred embodiment, the heat exchanger is disposed below the catalyst bed.

In an alternative embodiment, the heat exchanger is disposed in the region between the catalyst bed and an inner wall of the pressure vessel, more particularly in such a way that fluid flowing out of the catalyst bed is able to flow into the heat exchanger. Between the heat exchanger and the inner wall of the pressure vessel there may optionally be a further wall, as for example a wall of an insert disposed within the pressure vessel. The fluid may be guided via this wall. One preferred embodiment has the heat exchanger disposed between the outside of the catalyst bed and the inside of the pressure vessel. In the case of a synthesis device, more particularly in the case of an ammonia synthesis converter, in accordance with the prior art, therefore, the tube bundle heat exchanger which is typically disposed centrally within the hollow cylindrical catalyst bed is replaced by a heat exchanger disposed on the outside of the catalyst bed. Given a suitable flow regime within the heat exchanger, optimized heat transfer can be achieved, and the construction space required for the heat exchanger can thereby be minimized.

According to a further alternative embodiment, the catalyst bed is annular in configuration, and surrounds the heat exchanger concentrically.

The fluid flowing out of the catalyst bed preferably flows directly, preferably laterally, into the heat exchanger.

In a further preferred embodiment, the plate heat exchanger comprises a plurality of plates, with a flow-traversable interspace being formed between pairs of adjacent plates, and with (i) flow-traversable interspaces of a first group being in fluid communication with a common first fluid channel running perpendicularly to the plates, and being sealed off from the surroundings of the plate heat exchanger; and (ii) flow-traversable interspaces of a second group being in fluid communication with the surroundings and being sealed off from the interspaces of the first group.

The plate heat exchanger preferably comprises at least three plates, which are each disposed relative to one another in such a way that the longitudinal extents of the plates are oriented parallel to one another. With particular preference the plates have a congruent disposition. The individual plates preferably have a thickness in the range from 0.5 mm to 4 mm, more preferably in the range from 0.7 mm to 3.5 mm, in the range from 0.8 mm to 3 mm, in the range from 0.9 mm to 2.5 mm, in the range from 1.0 mm to 2.0 mm or in the range from 1.0 mm to 1.5 mm. The distance between two adjacent plates is preferably in the range from 5 mm to 40 mm, more preferably in the range from 6 mm to 35 mm, in the range from 7 mm to 30 mm, in the range from 8 mm to 25 mm, in the range from 9 mm to 20 mm or in the range from 10 mm to 15 mm. The distance between the plates preferably forms respective flow-traversable interspaces, each of which is traversed exclusively by one of the respective fluids.

According to one advantageous embodiment, the plates are configured of a material which comprises nickel, and so the resistance of the plates toward a nitrogenation, especially at a temperature above 400° C., is increased. The nickel content of the plate material is preferably greater than 30 wt %, more preferably greater than 35 wt %, as for example greater than 40 wt %.

The individual plates preferably have a pattern which improves the heat transfer in each case or harmonizes the distribution of flow along the plates. For this purpose the plates, for example, may have a fluted surface, thereby increasing the surface area of the individual plates. Furthermore, a corrugated profile of a plate may serve as a support to the adjacent plates and so increase the overall stability of the heat exchanger.

The flow-traversable interspaces of a first group are preferably in fluid communication with a common first fluid channel which runs perpendicularly to the plates. The fluid channel is preferably sealed off from the interspaces of a second group. The diameter of the first fluid channel is preferably in the range from 10 cm to 60 cm, more preferably in the range from 15 cm to 50 cm, in the range from 20 cm to 40 cm, in the range from 25 cm to 35 cm or in the range from 30 cm to 40 cm. The first fluid channel is preferably designed so that it penetrates the entire plate heat exchanger, but may be sealed off at one of the two ends. The first fluid channel is preferably disposed centrally along the longitudinal axis of the plate heat exchanger, so that the first fluid channel runs in each case through the geometric center points of the individual plates. The first channel is preferably configured for this purpose for introducing a first fluid into the plate heat exchanger or leading it out of said heat exchanger.

Flow-traversable interspaces of a second group are preferably in fluid communication with the surroundings of the plate heat exchanger, and are sealed off from the interspaces of the first group and preferably also from the first fluid channel.

A first fluid preferably flows through the flow-traversable interspaces of the first group, and a second fluid through the flow-traversable interspaces of the second group. The first fluid and the second fluid are preferably in fluid communication with one another, with the first fluid preferably comprising the fluid before flow through the catalyst bed, and the second fluid preferably comprising the fluid after flow through the catalyst bed. The second fluid is preferably hotter than the first fluid, and so there is heat transfer from the second to the first fluid.

The interspaces of the first group and the interspaces of the second group are preferably disposed in each case in alternation. Correspondingly, the interspaces are preferably traversed in alternation by a flow of the first, preferably "colder" fluid and by the second, preferably "hotter" fluid.

The individual plates preferably each have a circular shape. For example, the plates may be circular in design. The diameter of the individual plates is preferably in the range from 50 cm to 250 cm, more preferably in the range from 75 cm to 225 cm or in the range from 100 cm to 200 cm. The circular shape of the plates is particularly advantageous, since in the case of a hollow cylindrical shape of the catalyst beds, a plate heat exchanger having circular plates can be incorporated with particular ease into the interior of the hollow cylindrical catalyst beds, and a symmetrical arrangement is beneficial to the desired uniform distribution of flow.

The interspaces of the second group preferably have lateral inflow openings, in order to allow a fluid to flow into the interspaces of the second group. The second, "hotter" fluid preferably flows via the lateral inflow openings into the interspaces of the second group. The lateral inflow openings are preferably disposed in the immediate vicinity of the catalyst beds, so that the second, "hotter" fluid is able to flow into the plate heat exchanger immediately after flowing out from the catalyst bed. In this case there may possibly be no need for pipelines in which the fluid flowing out of the catalyst bed is collected and is passed to the plate heat exchanger.

In one preferred embodiment, the interspaces of the first group are in fluid communication with a plurality of second fluid channels which run perpendicularly to the plates and which are disposed in such a way that a fluid flows through the interspaces of the first group, starting from the first fluid channel, radially to the second fluid channels, or such that a fluid flows through the interspaces of the first group, starting from the second fluid channels, radially to the first fluid channel.

The second fluid channels are preferably in fluid communication with one another and with the first fluid channel via the interspaces of the first group. The second fluid channels are preferably all oriented parallel to one another and to the first fluid channel. The second fluid channels preferably all have the same shape and the same dimensions—for example, the same diameter in the case of a round cross section. The diameter of the second fluid channels, in the case of a round cross section, is preferably in the range from 1 cm to 25 cm, more preferably in the range from 2 cm to 20 cm, in the range from 3 cm to 19 cm or in the range from 4 cm to 18 cm. The plate heat exchanger preferably comprises at least 4 second fluid channels, more preferably at least 8, more preferably still at least 12, more preferably still at least 16, more preferably at least 20 or at least 24. The second fluid channels are preferably disposed on the outer edge of the plate heat exchanger. The distance between the longitudinal axes of the second fluid channels in the case of a round cross section or between the center points of the second fluid channels in the case of a more complicated cross section and the side edge of the plate heat exchanger is preferably the same for all second fluid channels and is in the range from 0.5 to 5 cm, more preferably in the range from 1 to 3 cm. Preferably a fluid, preferably the "colder" fluid, flows via the first fluid channel into the plate heat exchanger, flows through the interspaces of the first group radially from the first fluid channel to the second fluid channels, i.e., preferably radially from inside to outside, and departs the plate heat exchanger via the second fluid channels. In the case of this arrangement, the term used is "countercurrent heat transfer". In another preferred embodiment, a fluid, preferably the "colder" fluid, flows via the second fluid channels into the plate heat exchanger, flows through the interspaces of the first group radially from the second fluid channels to the first fluid channel, i.e., preferably from outside to inside, and departs the plate heat exchanger via the first fluid channel. The term used in the case of this arrangement is "concurrent heat transfer".

The interspaces of the second group are preferably in fluid communication with a plurality of third fluid channels which run perpendicularly to the plates and which are disposed in such a way that the fluid flows through the interspaces of the second group, starting from the lateral inflow openings, radially to the third fluid channels.

The third fluid channels are preferably in fluid communication with one another and with the inflow openings via the interspaces of the second group. The third fluid channels are preferably all oriented parallel to one another and also to the first fluid channel and to the second fluid channels. The third fluid channels preferably all have the same shape and the same dimensions—for example, the same diameter in the case of a round cross section. The diameter of the third fluid channels is preferably in the range from 5 cm to 20 cm, more preferably in the range from 6 cm to 19 cm, in the range from 7 cm to 18 cm, in the range from 8 cm to 18 cm, in the range from 10 cm to 18 cm or in the range from 12 cm to 16 cm. The plate heat exchanger preferably comprises at least 4 third fluid channels, more preferably at least 6, at least 8, at least 10, at least 12 or at least 16. If the first fluid channel is disposed along the central longitudinal axis of the plate heat exchanger, the third fluid channels are preferably disposed around the first fluid channel, on the inner edge of the plate heat exchanger. The minimum distance between the third fluid channels and the first fluid channel is then preferably the same for all third fluid channels and is preferably in the range from 0.5 cm to 5 cm, more preferably in the range from 1 cm to 3 cm. A fluid, preferably the "hotter" fluid, preferably flows via the lateral inflow openings into the interspaces of the second group, flows through them preferably radially from outside to inside, and departs the plate heat exchanger via the third fluid channels.

The first fluid channel and/or the second fluid channels and/or the third fluid channels preferably have a circular cross section. With particular preference the diameters of the third fluid channels are greater than the diameters of the second fluid channels. The ratio of the diameters of the third fluid channels to the diameter of the second fluid channels is preferably in the range from 2:1 to 1.1:1, more preferably in the range from 1.5:1 to 1,1:1. Alternatively the second fluid channels and/or the third fluid channels have an oval or V-shape cross section. If the second and the third fluid channels have an oval or V-shape cross section, the ratio of the area of the channel cross section of the third fluid channels to that of the second fluid channels is preferably in the range from 4:1 to 1.2:1, more preferably in the range from 2.3:1 to 1.2:1.

In the case of minimum space conditions within a plate heat exchanger, the high volume flow conditions needed for ammonia synthesis may possibly result in high velocities of the fluids, which may possibly lead to high pressure losses within the feed pipes.

The dimensions of the interspaces are preferably such that the pressure loss of the fluids on flow through the plate heat exchanger is at most 4 bar, more preferably at most 3 bar, 2 bar, 1 bar or 0.5 bar.

The pressure difference between two fluids which flow through the plate heat exchanger is preferably at most 5 bar, more preferably at most 4 bar, 3 bar, 2 bar or at most 1 bar.

A second aspect of the invention relates to a method for producing a product, the method comprising the following steps:

a) providing a reactant stream comprising reactants and optionally inert components and also optionally product;
b) introducing the reactant stream into a pressure vessel;
c) preheating the reactant stream in a heat exchanger which is disposed in the flow path of the reactant stream between an inlet of the pressure vessel and a catalyst bed;
d) conveying the preheated reactant stream onto the catalyst bed;
e) reacting at least a portion of the reactants of the reactant stream on the catalyst bed to form a product stream comprising reactants, product, and optionally inerts; and
f) introducing the product stream into the heat exchanger, the product stream being cooled; the heat exchanger being configured as a plate heat exchanger and the reaction of the reactants taking place in the at least one catalyst bed under an adiabatic regime.

All preferred embodiments described above in connection with the synthesis device of the invention are also valid analogously for the method of the invention for producing a product and are therefore not repeated.

The method of the invention preferably relates to an exothermic reaction with heterogeneous catalysis. With particular preference it concerns a method for producing ammonia from nitrogen and hydrogen reactants.

In step (a) of the method of the invention, a reactant stream is provided preferably continuously. The reactant stream preferably comprises liquid and/or gaseous components. Inert components here are those components which are inert in the particular method. The reactant stream preferably comprises hydrogen and nitrogen. Additionally, inert components which may be included in the reactant stream are, for example, methane and also, optionally, argon and/or, optionally, helium, and ammonia as product. The reactant stream preferably comprises hydrogen and nitrogen in a molar ratio of 3:1. The pressure of the reactant stream is preferably in the range from 90 to 400 bar.

In step (b) of the method of the invention, the reactant stream is introduced into a pressure vessel. The reactant stream is preferably introduced into the pressure vessel via an inlet which is preferably disposed at the upper end of the pressure vessel.

In step (c) of the method of the invention, the reactant stream is preheated in a heat exchanger. The reactant stream is preheated preferably to a temperature of at least 300° C., more preferably to a temperature of at least 320° C., at least 340° C., at least 360° C., at least 370° C., at least 380° C. or at least 400° C. The heat exchanger is preferably disposed in the flow path of the reactant stream between the Inlet of the pressure vessel and a catalyst bed, and more particularly is not located within the catalyst bed.

In step (d) the preheated reactant stream is conveyed onto the catalyst bed.

In step (e) at least a portion of the reactants are reacted to form a product stream comprising reactants, product and optionally inert components. The product stream immediately after the reaction is preferably hotter than the reactant stream immediately prior to the reaction. This may be the case as a result, for example, of the underlying reaction proceeding exothermically. The temperature of the product stream immediately after the reaction is preferably in the range from 420° C. to 550° C. The temperature difference between reactant stream and product stream immediately after the reaction is preferably in the range from 50° C. to 400° C. The product stream preferably comprises ammonia and also reactants. In one preferred embodiment, the reactant stream comprises hydrogen and nitrogen and also, optionally, inert components, and the product stream comprises ammonia, hydrogen and nitrogen, and also, optionally, inert components.

In step (f) of the method of the invention, the product stream is cooled in the heat exchanger. The product stream in step (d) is preferably cooled in the same heat exchanger in which the reactant stream in step (c) is preheated. The product stream is preferably cooled such that the temperature of the product stream after cooling is at most 450° C., more preferably at most 400° C., at most 350° C., or at most 300° C.

The heat exchanger is configured as a plate heat exchanger. The heat exchanger may be traversed by the reactant flow and product flow either in concurrent or in countercurrent.

The heat exchanger is preferably configured as a plate heat exchanger and is flow-traversed in countercurrent. In that case the reactant stream as "colder" fluid preferably flows via the first fluid channel into the plate heat exchanger, flows through the interspaces of the first group radially from the first fluid channel to the second fluid channels, i.e., preferably from inside to outside, and departs the plate heat exchanger preferably via the second fluid channels. The product stream as "hotter" fluid preferably flows via the lateral inflow openings into the interspaces of the second group, flows through these interspaces preferably radially from outside to inside, and departs the plate heat exchanger via the third fluid channels.

The heat exchanger is in another preferred embodiment configured as a plate heat exchanger and is flow-traversed in concurrent. In that case the reactant stream as "colder" fluid preferably flows via the second fluid channels into the plate heat exchanger, flows through the interspaces of the first group radially from the second fluid channels to the first fluid fluid channel, i.e., preferably radially from outside to inside, and departs the plate heat exchanger via the first fluid channel. The product stream as "hotter" fluid preferably flows via the lateral inflow openings into the interspaces of the second group, flows through these interspaces preferably radially from outside to inside, and departs the plate heat exchanger via the third fluid channels.

Owing to the specific circumstances of an ammonia synthesis, it is desirable for the plate temperatures to be limited to a range well below the gas exit temperatures from the catalyst beds. The gas exit temperatures from the catalyst beds here in the case of an ammonia synthesis are typically in the range from 420° C. to 550° C. Preferably, therefore, the plate heat exchanger of the invention in the case of an ammonia synthesis is flow-traversed in concurrent in order to keep the plate temperature low.

The method of the invention preferably comprises the following additional steps:
g) introducing the product stream into at least one further catalyst bed;
h) reacting at least a portion of the reactants of the product stream in the further catalyst bed to form a further product stream comprising reactants and product and optionally inerts.

Preferably in step (g) the product stream, after traversing the first heat exchanger, is introduced into a further catalyst bed.

Preferably in step (h) at least a portion of the reactants of the product stream are reacted to form a further product stream comprising reactants, product, and optionally inert components. The further product stream immediately after the reaction is preferably hotter than the product stream immediately before the reaction. This may be a result of the fact, for example, that the underlying reaction proceeds exothermically. The temperature of the further product stream immediately after the reaction is preferably in the range from 420° C. to 550° C. The temperature difference between product stream immediately before the reaction and the further product stream immediately after the reaction is preferably in the range from 50° C. to 400° C. The further product stream preferably comprises ammonia and also hydrogen, nitrogen, and optionally inert components such as, for example, argon, methane, and optionally helium.

In one preferred embodiment, steps (g) and (h) are repeated at least once. If steps (g) and (h) are repeated, the further product stream flows through a further heat exchanger before the further catalyst bed, said heat exchanger being preferably a helical heat exchanger or a plate heat exchanger.

The device of the invention is particularly suitable for implementing the method of the invention. A further aspect of the invention therefore relates to the use of the device of the invention in the method of the invention.

Figure 1:
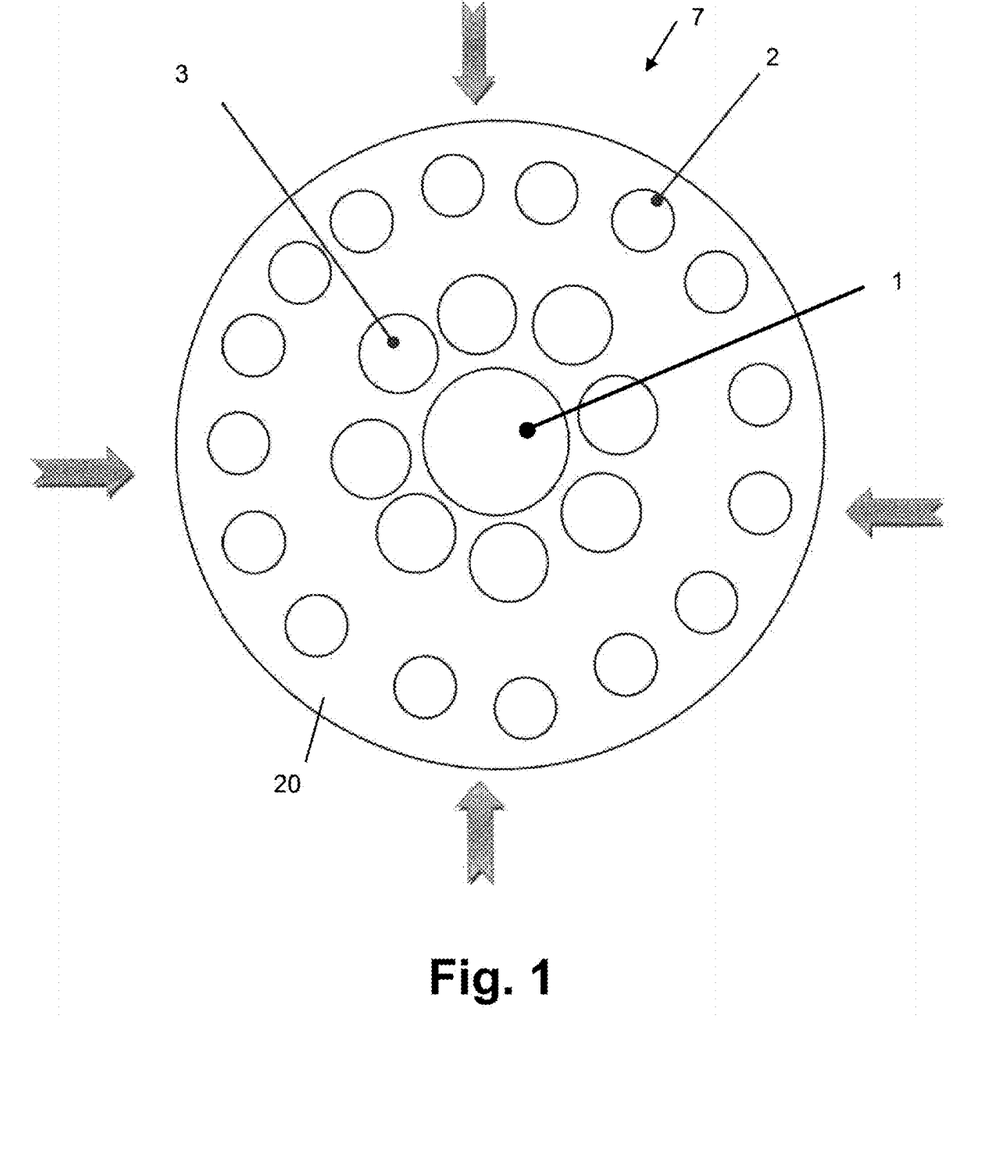
FIG. 1 is a sectional view of a plate heat exchanger according to one working example along a section plane oriented parallel to plates of the plate heat exchanger.

FIG. 1 shows a plate heat exchanger 7 according to one working exemplary embodiment of the invention. The plate heat exchanger 7 has a first fluid channel 1, which is disposed centrally along the longitudinal axis of the plate heat exchanger 7 perpendicularly to the individual plates 20 of the plate heat exchanger 7. The first fluid channel 1 has a circular cross section. Moreover, there are second 2 and third 3 fluid channels provided in the plate heat exchanger. The second 2 and third 3 fluid channels run perpendicularly to the plates 20 and are oriented parallel to one another. The second fluid channels 2 are preferably disposed in the region of the outer edge of the plates 20 of the plate heat exchanger 7. The third fluid channels 3 are preferably disposed around the first fluid channel 1. The second fluid channels 2 and the third fluid channels 3 are each arranged on an arc whose center point coincides with a longitudinal axis of the first fluid channel 1. The cross section of the second fluid channels 2 and of the third fluid channels 3 is circular in configuration. In deviation from this, the cross section of the second fluid channels 2 and of the third fluid channels 3 may be oval or V-shape in design.

Figure 2A:
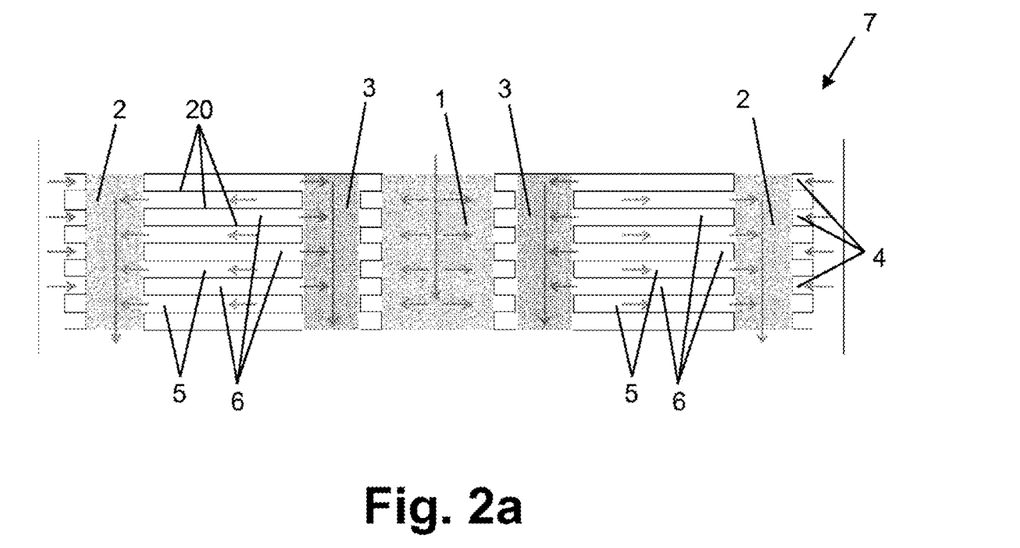
FIG. 2a is a schematic sectional view of the plate heat exchanger according to FIG. 1 along a section plane oriented perpendicularly to the plates of the plate heat exchanger, in order to illustrate a flow regime according to a countercurrent principle.
Figure 2B:
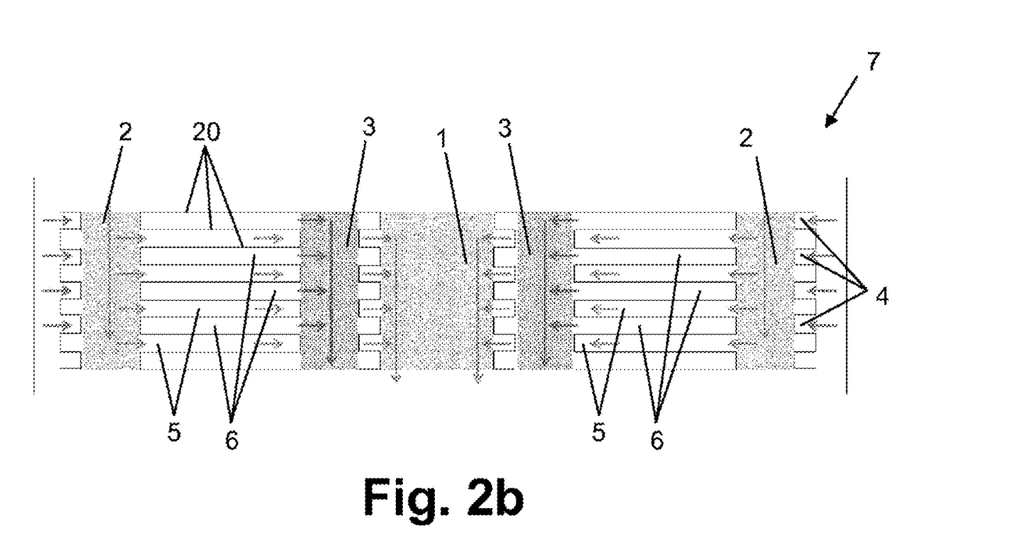
FIG. 2b is a schematic sectional view of the plate heat exchanger according to FIG. 1 along a section plane oriented perpendicularly to the plates of the plate heat exchanger, in order to illustrate a flow regime according to a cocurrent principle.

The flow conditions within the plate heat exchanger 7 will be explained below with reference to the representations in FIG. 2a and FIG. 2b, with FIG. 2 showing operation of the plate heat exchanger in accordance with the countercurrent principle, and FIG. 3 showing operation in accordance with the concurrent principle. Disposed between the individual plates 20 are flow-traversable interspaces, which for the following consideration are divided into a first group 5 and a second group 6, with adjacent interspaces each belonging to different groups 5, 6. The flow-traversable interspaces of the first group 5 are in fluid communication with the first fluid channel 1 and are sealed off from the surroundings of the plate heat exchanger 7. Accordingly, the flow of a first fluid into and/or out of the interspaces of the first group 5 in a direction parallel to the plates 20 is prevented. The flow-traversable interspaces of the second group 6 are in fluid communication with the surroundings of the plate heat exchanger 7 and are sealed off from the interspaces of the first group 5. In order to allow a second fluid to flow into the interspaces of the second group 6 from an inflow direction disposed parallel to the plates 20, the plate heat exchanger 7 comprises lateral inflow openings 4.

FIG. 2*a* outlines the flow regime within the plate heat exchanger 7, the plate heat exchanger 7 being operated in countercurrent. A first fluid in this case flows via the first fluid channel 1 into the plate heat exchanger 7, flows through the interspaces of the first group 5, radially from the first fluid channel 1 to the second fluid channels 2, in other words from inside to outside, and departs the plate heat exchanger 7 via the second fluid channels 2. The interspaces of the first group 5 are in this case connected via the first fluid channel 1 in the manner of a parallel circuit, and so the stream of the first fluid guided in the first fluid channel 1 is divided into a plurality of substreams. A second fluid flows via the lateral inflow openings 4 into the interspaces of the second group 6, flows through these interspaces radially from outside to inside, and departs the plate heat exchanger 7 via the third fluid channels 3. The interspaces of the second group 6 as well are connected via the third fluid channels 3 in the manner of a parallel circuit, and so the second fluid is passed from different interspaces of the second group 6 into the common third fluid channels 3.

FIG. 2*b* outlines the flow regime within the plate heat exchanger 7, the plate heat exchanger 7 being operated in concurrent. In concurrent operation, the first fluid here flows via the second fluid channels 2 into the plate heat exchanger 7, flows through the interspaces of the first group 5, radially from the second fluid channels to the first fluid channel 1, in other words from outside to inside, and departs the plate heat exchanger 7 via the first fluid channel 1. The interspaces of the first group 5 here are connected via the first fluid channel 1 in the manner of a parallel circuit. The second fluid flows via the lateral inflow openings 4 into the interspaces of the second group 6, flows through these interspaces radially from outside to inside, and departs the plate heat exchanger 7 via the third fluid channels 3. The interspaces of the second group 6 as well are connected via the third fluid channels 3 in the manner of a parallel circuit.

Figure 3:
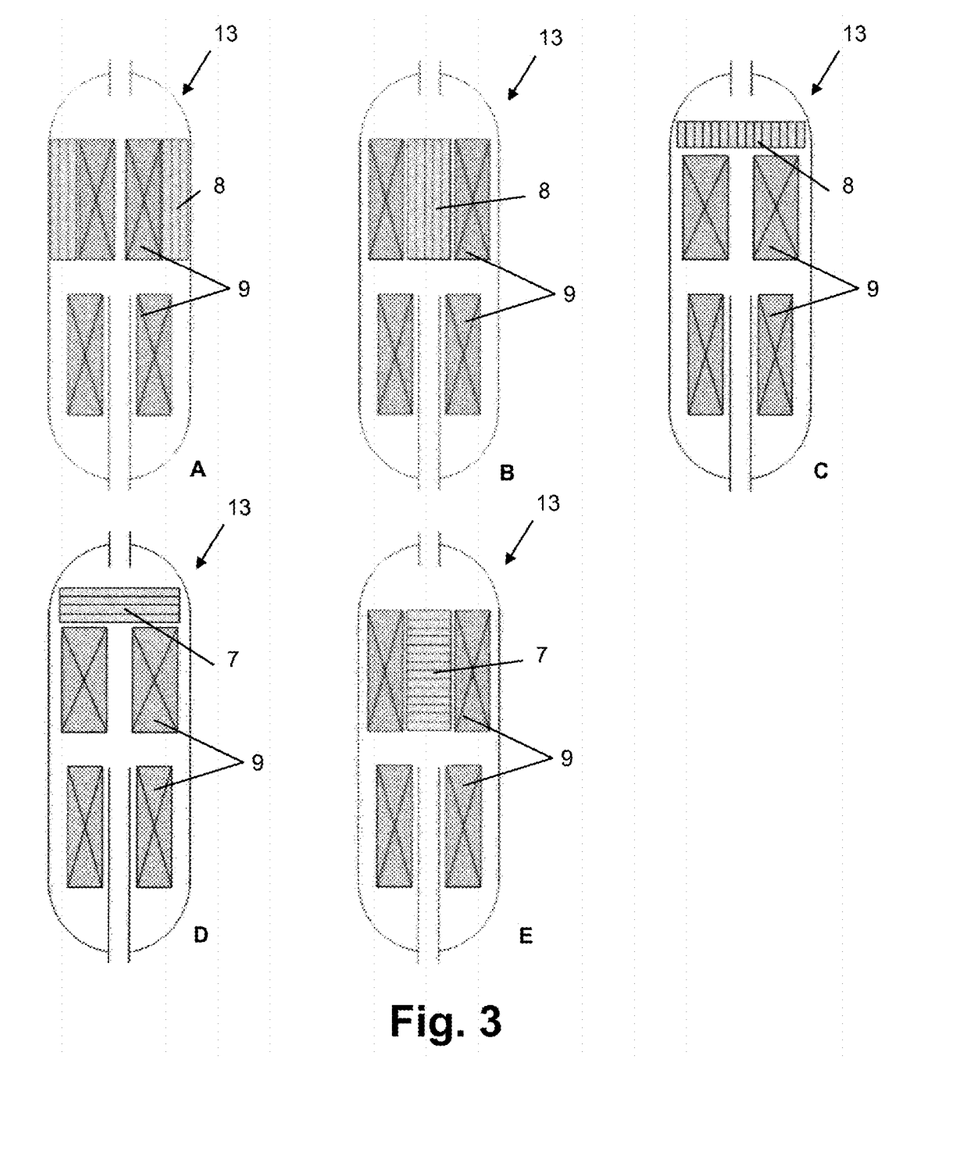
FIG. 3A is a schematic sectional view of a synthesis device having a heat exchanger that is disposed on an outside of hollow cylindrical catalyst beds.
FIG. 3B is a schematic sectional view of a synthesis device having a heat exchanger that is disposed on an inside of a hollow cylindrical catalyst bed.
FIG. 3C is a schematic sectional view of a synthesis device having a heat exchanger that is disposed above a catalyst bed.
FIG. 3D is a schematic sectional view of a synthesis device having a plate heat exchanger that is disposed above a catalyst bed.
FIG. 3E is a schematic sectional view of a synthesis device having a plate heat exchanger that is disposed on an inside of a hollow cylindrical catalyst bed.

FIG. 3 shows possible arrangements of heat exchangers 7, 8 in a synthesis device 13, more particularly an ammonia synthesis converter. The catalyst beds 9 of the synthesis device 13 are preferably of cylinder ring form, i.e., hollow cylindrical configuration. Example A shows a synthesis device 13 having a heat exchanger 8 which is disposed on the outside of the hollow cylindrical catalyst beds 9. Example B shows a synthesis device 13 having a heat exchanger 8 which is disposed on the inside of a hollow cylindrical catalyst bed 9. Example C shows a synthesis device 13 having a heat exchanger 8 which is disposed above a catalyst bed 9. In the case of synthesis devices having three catalyst beds disposed axially over one another, moreover, the possibly exists of disposing a heat exchanger 8 between two catalyst beds 9. In the case of such a design, in view of the high pressure losses, preference is given to providing a parallel circuit of the flow pathways, by means, for example, of a design of the heat exchanger 8 with a multi-way helix. Example D shows a synthesis device 13 having a plate heat exchanger 7 which is disposed above the catalyst bed 9, Example E shows a synthesis device having a plate heat exchanger 7 which is disposed on the inside of the hollow cylindrical catalyst bed 9. Alternatively to this, though not represented in the drawings, it is also possible for a plate heat exchanger to be disposed below a catalyst bed 9.

Figure 4:
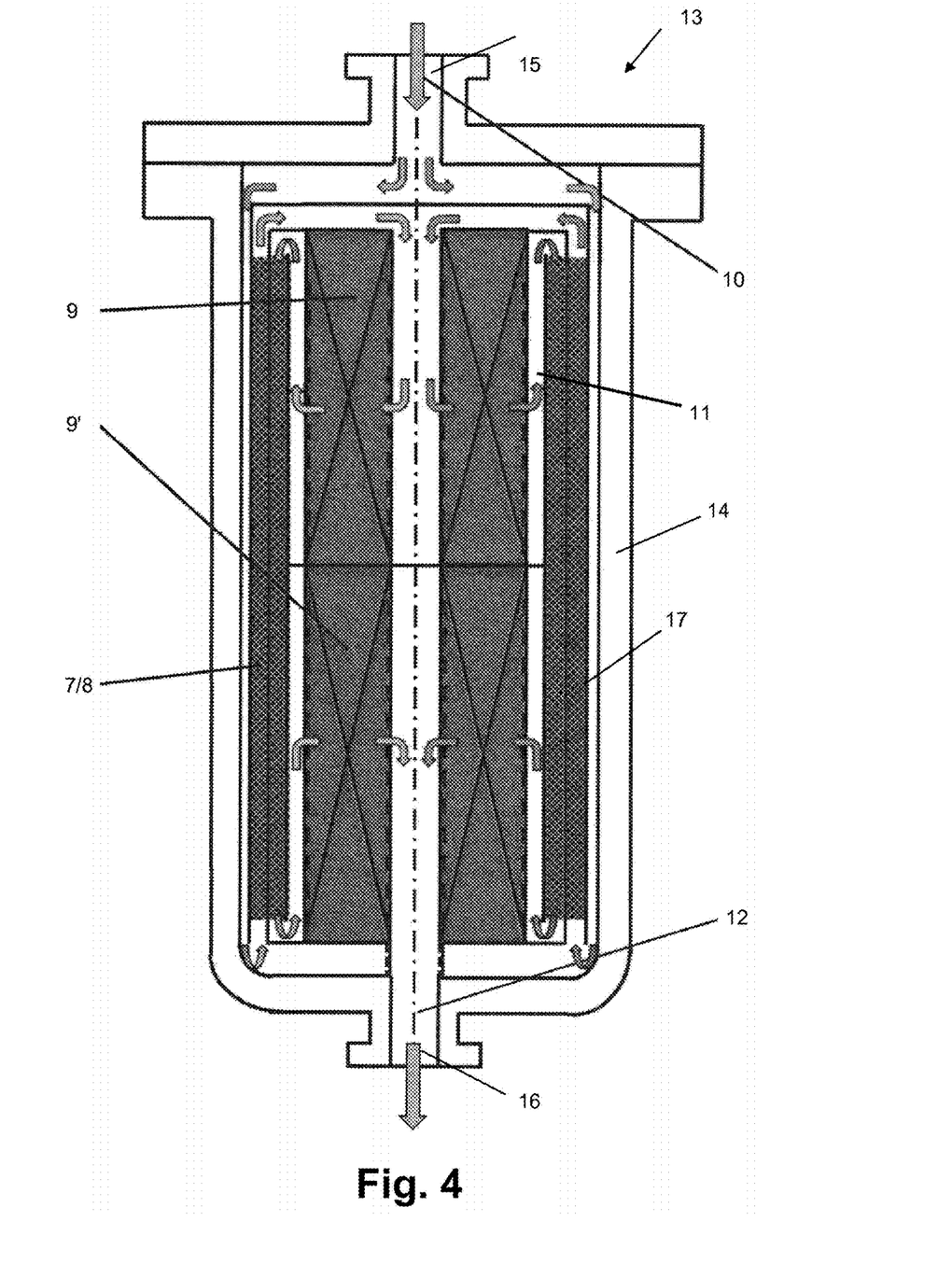
FIG. 4 is a schematic sectional view of the flow regime within a synthesis device having a heat exchanger that is disposed on an outside of a catalyst bed.

FIG. 4 shows by way of example a synthesis device 13 having two catalyst beds 9, 9' lying axially over one another and having a heat exchanger 7, 8 which is configured as a plate heat exchanger. The heat exchanger 7, 8 is disposed on the outside of the catalyst bed 9. The reactant stream 10 flows through an inlet 15 into a splitting compartment between the inside of an insert 17, which is disposed in the pressure vessel, and the outside of the heat exchanger 7, 8, this flow being downward, and it subsequently flows through the heat exchanger 7, 8 from bottom to top, the reactant stream 10 preferably being preheated to about 380° C. The reactant stream 10 thus preheated flows through the first catalyst bed 9 radially from inside to outside. At this point there is preferably an exothermic reaction. The product stream 11 preferably departs the catalyst bed 9 with a temperature of at most 525° C. and is introduced into the heat exchanger 7, 8, the product stream 11 being cooled. The product stream 11 thus cooled is passed into a further catalyst bed 9', through which it flows preferably radially from outside to inside, and a further portion of the reactants contained in the product stream 11 are converted into product. The further product stream 12 thus formed preferably departs the synthesis device 13 through the outlet 16 disposed in the lower region of the pressure vessel 14.

Figure 5:
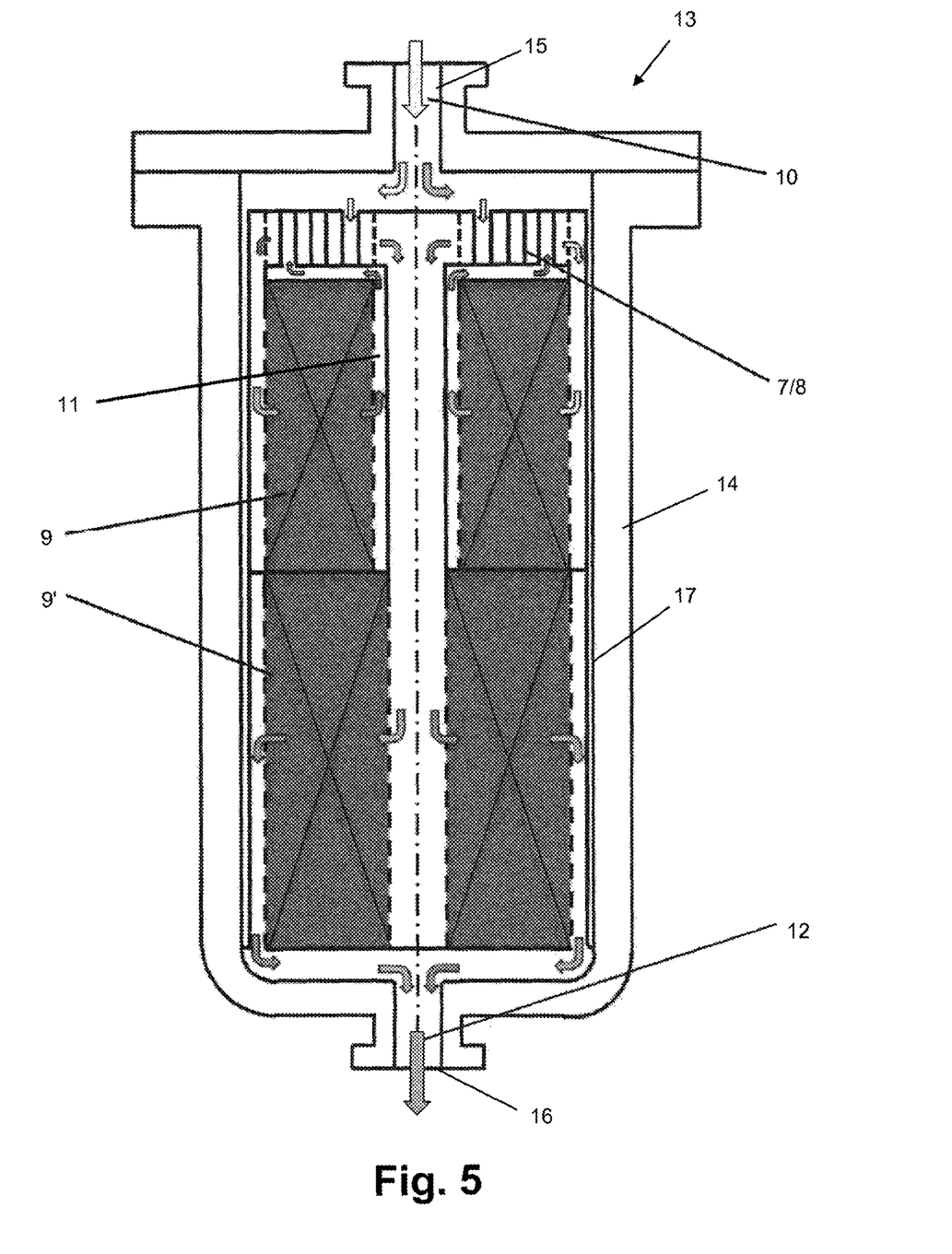
FIG. 5 is a schematic sectional view of the flow regime within a synthesis device having a heat exchanger that is disposed above a catalyst bed.

FIG. 5 shows by way of example a synthesis device 13 having two catalyst beds 9, 9', lying axially over one another, and having a heat exchanger, configured as a plate heat exchanger 7, which is disposed above the catalyst bed 9. The reactant stream 10, introduced into the pressure vessel through the inlet, flows into the heat exchanger 7, 8, is subsequently conveyed via a circumferential surface of the insert 17 between the inside of the pressure vessel 14 and the outside of the first catalyst bed 9, and flows through the first catalyst bed 9 radially from outside to inside. The hot product stream 11 flows along the inside of the first catalyst bed 9 into the heat exchanger 7, 8, where it is cooled. The product stream 11 cooled in this way is passed into a second catalyst bed 9', through which it flows radially from inside to outside. The further product stream 12 thus formed is subsequently passed out of the synthesis device 13 through an outlet 16 which is disposed in the lower region of the pressure vessel 14.

The above figures show synthesis devices 13, more particularly ammonia synthesis converters, which comprise the following components:
a) a pressure vessel 14 which comprises an inlet 15 and an outlet 16 for a fluid;
b) at least one catalyst bed 9 which is disposed within the pressure vessel 14;
c) at least one heat exchanger 7, 8, the heat exchanger 7, 8 being disposed in the flow path of the fluid between the inlet 15 of the pressure vessel 14 and the catalyst bed 9 in such a way that the fluid flowing into the catalyst bed 9 is heated by the fluid flowing out of the catalyst bed 9.

The heat exchangers of these synthesis devices 13 are configured as plate heat exchangers 7, 8. The heat exchanger configured as plate heat exchanger 7, 8 has a much higher heat flow density in comparison to tube bundle heat exchangers, and so the economics of the synthesis devices 13 are enhanced.

LIST OF REFERENCE NUMERALS

1 First fluid channel
2 Second fluid channels
3 Third fluid channels
4 Lateral inflow openings
5 Flow-traversable interspaces of the first group
6 Flow-traversable interspaces of the second group
7 Plate heat exchanger
8 Plate heat exchanger
9/9' Catalyst bed
10 Reactant stream
11 Product stream
12 Further product stream
13 Synthesis device
14 Pressure vessel
15 Inlet
16 Outlet
17 Insert
20 Plate

What is claimed is:

1. A synthesis device for exothermic reactions with heterogeneous catalysis, the synthesis device comprising:
a pressure vessel that includes an inlet and an outlet for fluid;
a catalyst bed disposed within the pressure vessel, the catalyst bed having a cylinder ring form or hollow cylindrical configuration; and
a plate heat exchanger disposed in a flow path of fluid between the inlet of the pressure vessel and the catalyst bed such that fluid flowing into the catalyst bed is heated by fluid flowing out of the catalyst bed, wherein the plate heat exchanger is disposed outside a reactor volume occupied by the catalyst bed in the pressure vessel, wherein the plate heat exchanger is disposed on an inside of the catalyst bed such that the catalyst bed surrounds the plate heat exchanger concentrically.

2. The synthesis device of claim 1 wherein the plate heat exchanger is one of a plurality of heat exchangers.

3. The synthesis device of claim 1 wherein the plate heat exchanger is a first plate heat exchanger, wherein a second plate heat exchanger is disposed below the catalyst bed.

4. The synthesis device of claim 1 wherein the plate heat exchanger is a first plate heat exchanger, wherein a second plate heat exchanger is disposed in a region between the catalyst bed and an inner wall of the pressure vessel.

5. The synthesis device of claim 1 wherein the catalyst bed is one of a plurality of catalyst beds disposed axially over one another in the pressure vessel.

6. The synthesis device of claim 1 wherein the plate heat exchanger comprises a plurality of plates with a flow-traversible interspace between adjacent pairs of the plurality of plates, with the flow-traversible interspaces of a first group being in fluid communication with a common first fluid channel running perpendicularly to the plurality of plates and being sealed off from surroundings of the plate heat exchanger, with the flow-traversible interspaces of a second group being in fluid communication with the surroundings and being sealed off from the interspaces of the first group.

7. The synthesis device of claim 6 wherein the interspaces of the first group and the interspaces of the second group are disposed in alternation.

8. The synthesis device of claim 6 wherein each of the plurality of plates has a circular shape.

9. The synthesis device of claim 6 wherein the interspaces of the second group have lateral inflow openings that allow fluid to flow into the interspaces of the second group.

10. The synthesis device of claim 6 wherein the interspaces of the first group are in fluid communication with a plurality of second fluid channels that run perpendicularly to the plurality of plates and are disposed such that fluid flows
through the interspaces of the first group, starting from the common first fluid channel, radially to the plurality of second fluid channels, or
through the interspaces of the first group, starting from the plurality of second fluid channels, radially to the common first fluid channel.

11. The synthesis device of claim 10 wherein the interspaces of the second group are in fluid communication with a plurality of third fluid channels that run perpendicular to the plurality of plates and are disposed such that fluid flows through the interspaces of the second group, starting from lateral inflow openings of the interspaces of the second group, radially to the plurality of third fluid channels.

12. A method for producing a product, the method comprising:
providing a reactant stream comprising reactants, wherein the reactants include at least hydrogen and nitrogen;
introducing the reactant stream into a pressure vessel;
preheating the reactant stream in a plate heat exchanger that is disposed in a flow path of the reactant stream between an inlet of the pressure vessel and a catalyst bed;
conveying the reactant stream that has been preheated onto the catalyst bed;
reacting at least a portion of the reactants of the reactant stream on the catalyst bed under an adiabatic regime to form a product stream comprising reactants and product, wherein the product stream comprises ammonia; and
introducing the product stream into the plate heat exchanger, the product stream being cooled.

13. The method of claim 12 wherein the catalyst bed is a first catalyst bed, wherein the product stream is a first product stream, the method comprising:
introducing the product stream into a second catalyst bed; and
reacting at least a portion of the reactants of the first product stream in the second catalyst bed to form a second product stream comprising reactants and product.

14. The method of claim 12 wherein the reaction is an exothermic reaction with heterogeneous catalysis.

15. The method of claim 12 wherein the preheating comprises preheating the reactant stream to a temperature of at least 300° C.

* * * * *